US012551387B2

(12) United States Patent
Allcorn et al.

(10) Patent No.: US 12,551,387 B2
(45) Date of Patent: Feb. 17, 2026

(54) WHEELCHAIR MOBILITY LEVER DEVICE

(71) Applicants: Peter Allcorn, Garner, NC (US); Christopher Ian Allcorn, Advance, NC (US)

(72) Inventors: Peter Allcorn, Garner, NC (US); Christopher Ian Allcorn, Advance, NC (US)

( * ) Notice: Subject to any disclaimer, the term of this patent is extended or adjusted under 35 U.S.C. 154(b) by 669 days.

(21) Appl. No.: 18/062,750

(22) Filed: Dec. 7, 2022

(65) Prior Publication Data

US 2023/0218458 A1 Jul. 13, 2023

Related U.S. Application Data

(60) Provisional application No. 63/297,834, filed on Jan. 10, 2022.

(51) Int. Cl.
*A61G 5/02* (2006.01)

(52) U.S. Cl.
CPC ............ *A61G 5/025* (2013.01); *A61G 5/022* (2013.01)

(58) Field of Classification Search
CPC ............................... A61G 5/025; A61G 5/022
See application file for complete search history.

(56) References Cited

U.S. PATENT DOCUMENTS 4,735,431 A * 4/1988 Tait ........................ A61G 5/023 280/250.1
4,840,076 A * 6/1989 Brubaker ............. A61G 5/1008 280/246
5,927,739 A * 7/1999 Evling ..................... A61G 5/02 74/557
6,234,504 B1 * 5/2001 Taylor .................... A61G 5/023 280/DIG. 10
6,755,430 B1 * 6/2004 Watwood ............... A61G 5/025 280/250.1
6,893,035 B2 * 5/2005 Watwood .............. F16D 41/088 280/247
7,261,309 B2 * 8/2007 Watwood ............... A61G 5/025 280/244
7,780,179 B2 * 8/2010 Brown ................... A61G 5/023 280/247
7,837,210 B2 * 11/2010 Kylstra .................. A61G 5/025 280/244
8,016,310 B2 * 9/2011 Kylstra .................. A61G 5/023 280/244
8,087,684 B2 * 1/2012 Bloswick ............... A61G 5/023 280/250.1
8,109,529 B2 * 2/2012 Rand ...................... A61G 5/025 280/244
8,152,188 B2 * 4/2012 Kylstra .................. A61G 5/023 280/255

(Continued)

*Primary Examiner* — Valentin Neacsu
*Assistant Examiner* — Michael R Stabley
(74) *Attorney, Agent, or Firm* — Brennan, Manna & Diamond, LLC

(57) ABSTRACT

The present invention relates to a wheelchair mobility handle device. The device is comprised of a handle assembly is positioned within a hollow rim, wherein the rim is fastened to a wheel of a wheelchair. A band positioned within the rim attaches to a bearing on each side of a handle housing. Each bearing then attaches to a handle such that the handle can be pushed forward or backward to tighten the band and propel the wheelchair wheel forward or backward.

13 Claims, 5 Drawing Sheets

(56) References Cited

U.S. PATENT DOCUMENTS

| | | | | |
|---|---|---|---|---|
| 8,186,699 | B2 * | 5/2012 | Green .................... | A61G 5/025 280/242.1 |
| 2009/0295119 | A1 * | 12/2009 | Bloswich ............. | A61G 5/1024 280/250.1 |

* cited by examiner

WHEELCHAIR MOBILITY LEVER DEVICE

CROSS-REFERENCE TO RELATED APPLICATION

The present application claims priority to, and the benefit of, U.S. Provisional Application No. 63/297,834, which was filed on Jan. 10, 2022, and is incorporated herein by reference in its entirety.

FIELD OF THE INVENTION

The present invention relates generally to the field of wheelchairs. More specifically, the present invention relates to a wheelchair mobility lever device. The device is comprised of a handle assembly positioned within a hollow rim, wherein the rim is fastened to a wheel of a wheelchair. A band positioned within the rim attaches to a bearing on each side of a handle housing. Each bearing then attaches to a handle such that the handle can be pushed forward or backward to tighten the band and propel the wheelchair wheel forward or backward. Accordingly, the present disclosure makes specific reference thereto. Nonetheless, it is to be appreciated that aspects of the present invention are also equally applicable to other like applications, devices, and methods of manufacture.

BACKGROUND

Existing wheelchair rims can cause significant problems for wheelchair users over long periods. Firstly, wheelchair rims are often so small such that a user cannot adequately grip the rim to propel the wheelchair. As a result, the user is forced to handle the wheel of the wheelchair, which results in dirt and debris from the wheel being transferred to the hand of the user. In addition, manual propulsion methods required to use existing wheelchair rims require users to reach on each side of the wheelchair to grasp the rims. This creates a forward posture to avoid reaching over armrests, which can become uncomfortable after a period of time and fatiguing to the smaller muscles of the body (such as the anterior deltoid) being used to propel the wheelchair. Further, many users with limited physical strength and dexterity tend to use gravity assistance to propel the wheelchair manually by placing their hands on the forward portion of the rim, pushing downward instead of forward, and creating a forward lumbar thoracic posture. This often results in back discomfort because the back of the user is not against the backrest in this position. In addition, forward posture restricts the ribs from expanding, thereby preventing lung expansion within the rib cage due to less oxygen intake and subsequently resulting in endurance loss.

Therefore, there exists a long-felt need in the art for an improved wheelchair rim. There also exists a long-felt need in the art for a wheelchair mobility handle device that allows a user to maintain an upright posture during the use of a wheelchair to facilitate proper lung expansion for optimal oxygen intake and increased endurance. Further, there exists a long-felt need in the art for a wheelchair mobility handle device that reduces strain on the user's hands and eliminates the need for a user to grip the wheels of a wheelchair during use. In addition, there exists a long-felt need in the art for a wheelchair mobility handle device that allows a user to use larger muscle groups when using a wheelchair mobility handle device with a wheelchair.

The subject matter disclosed and claimed herein, in one embodiment thereof, comprises a wheelchair mobility handle device. The wheelchair mobility handle device is primarily comprised of at least one rim with at least one handle assembly. The handle assembly is positioned within the hollow rim, wherein the rim is fastened to a wheel of a wheelchair. The handle assembly is comprised of a handle. A band positioned within the rim attaches to a bearing on each side of a handle housing. Each bearing then attaches to the handle. In this manner, the handle can be pushed forward to tighten the band and propel the wheelchair wheel forward. Conversely, the handle can be pushed backward to tighten the band and propel the wheelchair wheel backward. Further, the handle is positioned vertically and perpendicular to the handle housing when not in use.

In this manner, the wheelchair mobility handle device of the present invention accomplishes all of the foregoing objectives and provides an improved wheelchair rim that allows a user to maintain an upright posture during use. This advantageously facilitates proper lung expansion for optimal oxygen intake and increased endurance. Further, the device reduces strain on the user's hands and eliminates the need for a user to grip the wheels of a wheelchair during use.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a wheelchair mobility handle device primarily comprised of at least one rim with at least one handle assembly. In the preferred embodiment, the rim is attached to a wheel of a wheelchair. The rim is preferably hollow such that at least one channel is located within the rim which receives at least one band. The rim is also comprised of at least one opening that allows at least one handle of at least one lever assembly located within the rim to protrude outward away from the rim.

The handle is grasped by a user during use and may be any ergonomic length, shape, and/or size to facilitate ergonomic use. The handle is attached to a handle housing located within the rim via at least one hinge point that allows the handle to articulate 180 degrees relative to a ground surface that the wheelchair wheel is resting on. As a result, the handle can be pushed forward and backward relative to the opening during use.

As noted, the band resides within at least one channel within the rim that ensures the band does not become tangled or out of tension during use. The band attaches to the handle housing at the first end and the second end of the housing. In the preferred embodiment, each end of the housing is comprised of at least one captured bearing, roller, or other similar rolling fastener known in the art. The band connects to each bearing via at least one bearing fastener. Each fastener is then connected to the handle near or at the hinge point via at least one handle fastener.

In the neutral position, the handle is in a vertical, perpendicular position relative to the housing such that pushing the handle forward within the opening propels the wheelchair wheel forward. To accomplish this, the bearing of the second end of the housing is moved forward within at least one channel within the housing when the handle is pushed forward. This in turn tightens the band within the channel of the rim. Because of this movement, the bearing of the first end is pushed through the channel towards the opening of the first end. However, because the opening is smaller than the bearing, the bearing is captured within the housing.

Accordingly, the wheelchair mobility handle device of the present invention is particularly advantageous as it provides improved wheelchair rim that allows a user to maintain an upright posture during the use of a wheelchair to facilitate proper lung expansion for optimal oxygen intake and increased endurance. Further, the device reduces strain on the user's hands and eliminates the need for a user to grip the wheels of a wheelchair during use. Also, the device allows a user to use larger muscle groups when using a wheelchair mobility handle device with a wheelchair instead of smaller muscle groups that fatigue easier. In this manner, the wheelchair mobility handle device overcomes the limitations of existing wheelchairs known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
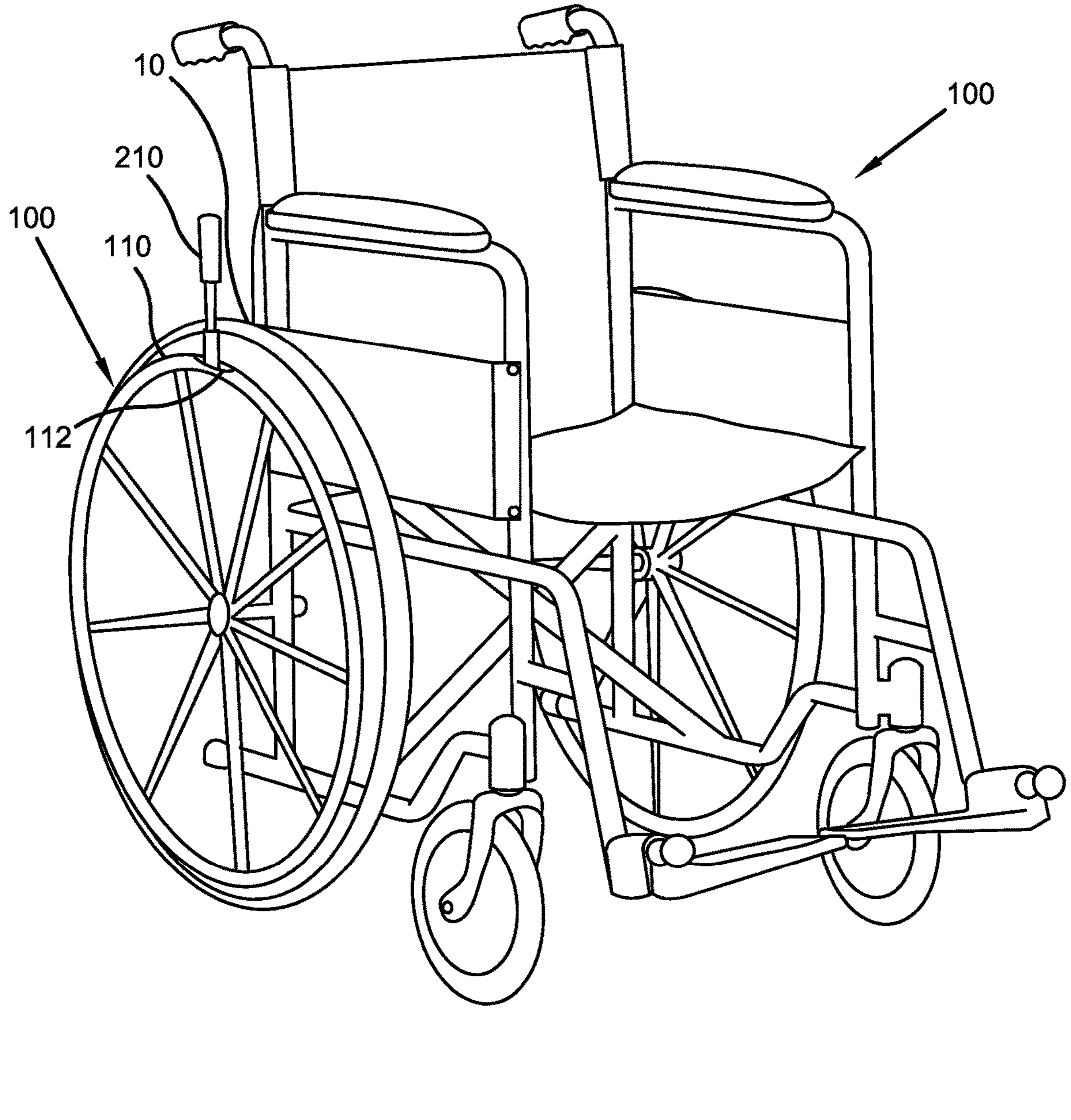
FIG. 1 illustrates a perspective view of one potential embodiment of a wheelchair mobility handle device of the present invention while attached to a wheelchair wheel in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an improved wheelchair rim that allows a user to maintain an upright posture during the use of a wheelchair in order to facilitate proper lung expansion for optimal oxygen intake and increased endurance. Further, there exists a long-felt need in the art for a wheelchair mobility handle device that reduces strain on the user's hands and eliminates the need for a user to grip the wheels of a wheelchair during use. In addition, there exists a long-felt need in the art for a wheelchair mobility handle device that allows a user to use larger muscle groups when using a wheelchair mobility handle device with a wheelchair.

The present invention, in one exemplary embodiment, is comprised of a wheelchair mobility handle device primarily comprised of at least one rim with at least one handle assembly. In the preferred embodiment, the rim is attached to a wheel of a wheelchair and is preferably hollow such that at least one channel is located within the rim which receives at least one band. The rim is also comprised of at least one opening that allows at least one handle of at least one lever assembly located within the rim to protrude outward away from the rim.

The handle is grasped by a user during use. The handle may be any ergonomic length, shape, and/or size to facilitate ergonomic use. The handle is attached to a handle housing located within the rim via at least one hinge point that allows the handle to articulate 180 degrees relative to a ground surface that the wheelchair wheel is resting on. Therefore, the handle can be pushed forward and backward relative to the opening during use.

Residing within at least one channel within the rim ensures the band does not become tangled or out of tension during use. The band further attaches to the handle housing at the first end and the second end of the housing. In the preferred embodiment, each end of the housing is comprised of at least one captured bearing, roller, or other similar rolling fastener known in the art. The band connects to each bearing via at least one bearing fastener. Each fastener is then connected to the handle near or at the hinge point via at least one handle fastener.

In the neutral position, the handle is in a vertical, perpendicular position relative to the housing such that pushing the handle forward within the opening propels the wheelchair wheel forward. To accomplish this, the bearing of the second end of the housing is moved forward within at least one channel within the housing when the handle is pushed forward. This in turn tightens the band within the channel of the rim. Because of this movement, the bearing of the first end is pushed through the channel towards the opening of the first end. However, because the opening is smaller than the bearing, the bearing is captured within the housing.

Accordingly, the wheelchair mobility handle device of the present invention is particularly advantageous as it provides an improved wheelchair rim that allows a user to maintain an upright posture during the use of a wheelchair in order to facilitate proper lung expansion for optimal oxygen intake and increased endurance. Further, the device reduces strain on the user's hands and eliminates the need for a user to grip the wheels of a wheelchair during use. Also, the device allows a user to use larger muscle groups when using a wheelchair mobility handle device with a wheelchair instead of smaller muscle groups that fatigue easier. In this manner, the wheelchair mobility handle device overcomes the limitations of existing wheelchairs known in the art.

Figure 2:
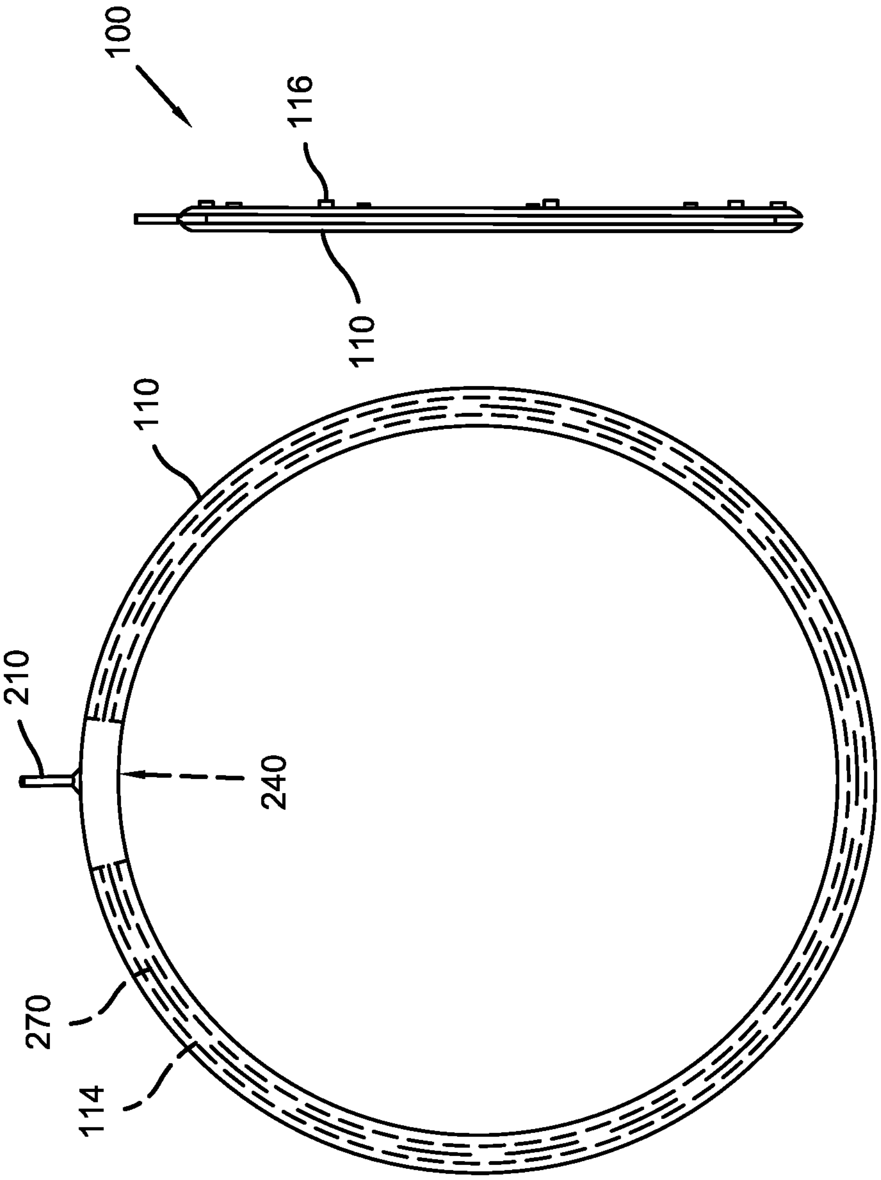
FIG. 2 illustrates a front view and a side view of one potential embodiment of a wheelchair mobility handle device of the present invention in accordance with the disclosed architecture.

Referring initially to the drawings, FIG. 1 illustrates a perspective view of one potential embodiment of a wheelchair mobility handle device 100 of the present invention while attached to a wheelchair wheel 10 in accordance with the disclosed architecture. The device 100 is primarily comprised of at least one rim 110 with at least one handle assembly 200. In the preferred embodiment, the rim 110 is circular in shape and is shaped/sized to fit any wheelchair wheel 10 known in the art. The rim 110 may be fixedly attached to the wheel 10 or may be removably attached via at least one fastener 116 such as, but not limited to, a bolt, an Allen bolt, a screw, a magnet, a tongue and groove fastener assembly, etc., as best seen in FIG. 2. The device 100 and all components including, but not limited to, the rim 110 are preferably made from a rigid metal material such as, but not limited to, stainless steel or aluminum or a rigid plastic material such as, but not limited to, acrylic, polycarbonate, polyethylene, thermoplastic, acrylonitrile butadiene styrene, low-density polyethylene, medium-density polyethylene, high-density polyethylene, polyethylene terephthalate, polyvinyl chloride, polystyrene, polylactic acid, acetal, nylon, fiberglass, recycled plastic, biodegradable plastic, etc. unless otherwise stated herein.

The rim 110 is preferably hollow such that at least one channel 114 is located within the rim 110. The channel 114 receives at least one band 270. The band 270 attaches within a first end 246 and a second end 248 of the handle housing 240, as will be explained more fully below. The band 270 is preferably comprised of a non-elastic material. However, it is also contemplated that the band 270 may be comprised of a rubber material such as, but not limited to, Neoprene, silicone, nitrile, EPDM, Styrene-Butadiene, Butyl, natural, fluorosilicone, etc. In one embodiment, the rubber material is elastic such that energy can be easily transferred through elastic stretching of the band 270.

The rim 110 is also comprised of at least one opening 112 that allows at least one handle 210 of at least one lever assembly 200 located within the rim 110 to protrude outward away from the rim 110. The handle 210 is grasped by a user during use. In the preferred embodiment, the handle 210 is generally cylindrical. However, the handle 210 may be any ergonomic length, shape, and/or size to facilitate ergonomic use. In one embodiment, the handle 210 is comprised of at least one textured grip area 212 that aids a user in grasping the handle 210. In one embodiment, the area 212 is a textured rubber area that may be sweatproof. In an additional embodiment, the area 212 to contoured to receive the hand and/or fingers of the user.

Figure 3:
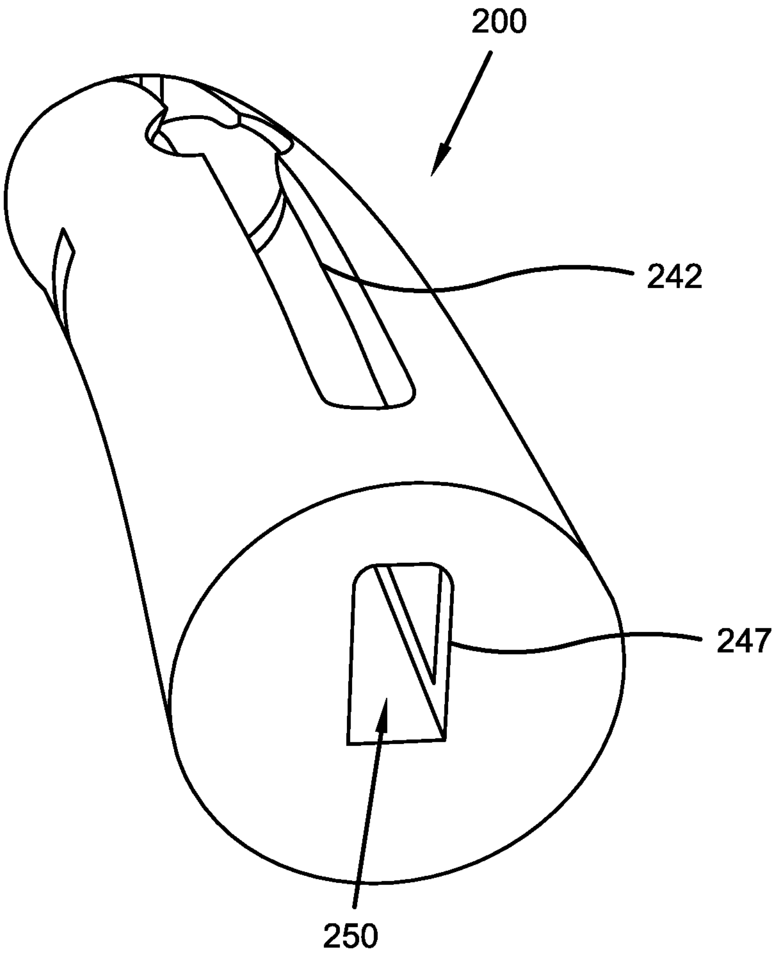
FIG. 3 illustrates a front-on view of a handle housing of one potential embodiment of a wheelchair mobility handle device of the present invention while attached to a wheelchair wheel in accordance with the disclosed architecture.

The handle 210 is attached to a handle housing 240 located within the rim 110. In one embodiment, the handle 210 attaches to the housing 240 through at least one top opening 242 of the housing 240 (as best seen in FIG. 3) via at least one hinge point 214 that allows the handle 210 to articulate 180 degrees relative to a ground surface that the wheelchair wheel 10 is resting on. The hinge point 214 may be, but is not limited to, a pivot pin, a hinge, etc. In this manner, the handle 210 can be pushed forward and backward relative to the opening 112 during use.

The band 270 resides within at least one channel 114 within the rim 110 which ensures the band 270 does not become tangled or out of tension during use. The band 270 attaches to the handle housing 240 at the first end 246 and the second end 248 of the housing 240. In the preferred embodiment, each end 246,248 is comprised of at least one captured bearing 260, roller, or other similar rolling fastener known in the art. The band 270 connects to each bearing 260 via at least one bearing fastener 262. The fastener 262 may be any fastener type known in the art but is preferably a flexible wire or a flexible clip. Each bearing 260 is then connected to the handle 210 near or at the hinge point 214 via at least one handle fastener 216. The fastener 216 may be any fastener type known in the art but is preferably a flexible wire or a flexible clip.

Figure 4:
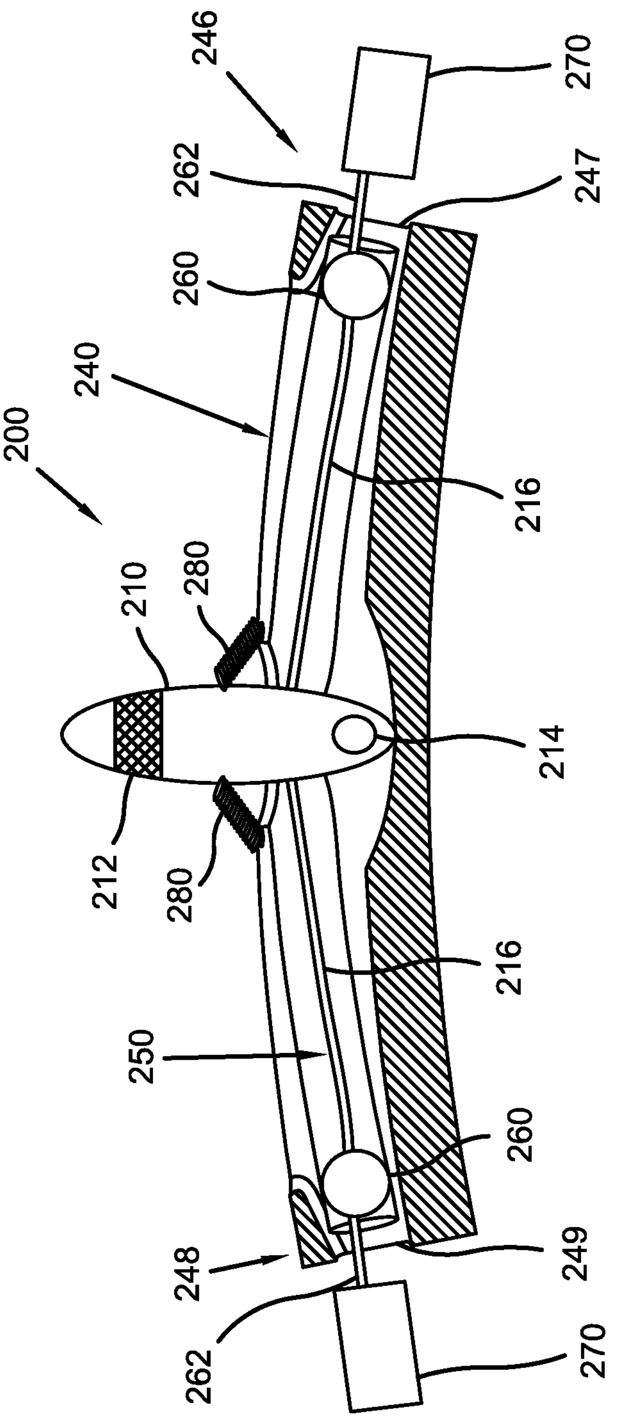
FIG. 4 illustrates a side cross-sectional view of the handle assembly of one potential embodiment of a wheelchair mobility handle device of the present invention while the handle is in the neutral position in accordance with the disclosed architecture.
Figure 5:
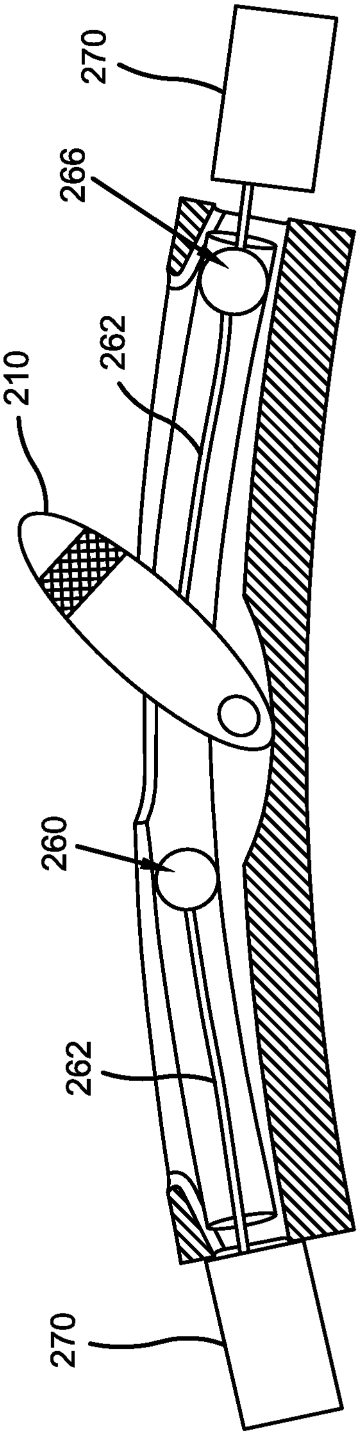
FIG. 5 illustrates a side cross-sectional view of the handle assembly of one potential embodiment of a wheelchair mobility handle device of the present invention while the handle is in the forward position in accordance with the disclosed architecture.

FIG. 4 illustrates a side cross-sectional view of the handle assembly 200 of one potential embodiment of a wheelchair mobility handle device 100 of the present invention while the handle is in the neutral position in accordance with the disclosed architecture. In the neutral position, the handle 210 is in a vertical, perpendicular position relative to the housing 240. Pushing the handle 210 forward within the opening 112 propels the wheelchair wheel 10 forward by moving the rim 110, as seen in FIG. 5. To do so, the bearing 260 of the second end 248 of the housing 240 is moved forward within at least one channel 250 within the housing 240 when the handle 210 is pushed forward. This in turn tightens the band 270 within the channel 114 of the rim 110. Because of this movement, the bearing 260 of the first end 246 is pushed through the channel 250 toward the opening 247 of the first end 246. However, because the opening 247 is smaller than the bearing 260, the bearing 260 is captured within the housing 240.

Conversely, pushing the handle 210 backward within the opening 112 propels the wheelchair wheel 10 backward by moving the rim 110. To do so, the bearing 260 of the first end 246 of the housing 240 is moved backward within at least one channel 250 within the housing 240 when the handle 210 is pushed backward. This in turn tightens the band 270 within the channel 114. Because of this movement, the bearing 260 of the second end 248 is pushed through the channel 250 toward the opening 249 of the first end 248. However, because the opening 249 is smaller than the bearing 260, the bearing 260 is captured within the housing 240.

Therefore, the handle assembly 200 allows for bi-lateral motion of the handle 210. In this manner, the handle 210 can be pushed forward to propel the wheelchair wheel 10 forward and pushed backward to propel the wheelchair wheel 10 backward. When in the vertical, perpendicular (i.e., neutral) position, the device 100 does not propel the wheel 10.

In one embodiment, the handle 210 is automatically returned to the neutral, vertical position when the handle 210 is released by a user. This may be accomplished by the bi-lateral tension on the handle 210 by the band 270. However, in a differing embodiment, at least one spring 280 is attached to the handle 210 and the housing 240. In the preferred embodiment, the device 100 has one spring 280 on each side to provide equal bi-lateral tension to the handle 210 such that when the handle 210 is released by a user it returns to a neutral, vertical position.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "wheelchair mobility handle device" and "device" are interchangeable and refer to the wheelchair mobility handle device 100 of the present invention.

Notwithstanding the foregoing, the wheelchair mobility handle device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the wheelchair mobility handle device 100 as shown in the FIGS. are for illustrative purposes only, and that many other sizes and shapes of the wheelchair mobility handle device 100 are well within the scope of the present disclosure. Although the dimensions of the wheelchair mobility handle device 100 are important design parameters for user convenience, the wheelchair mobility handle device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wheelchair mobility handle device comprising:

a hollow rim;

a handle assembly comprised of a handle and a handle housing positioned within the hollow rim, wherein the handle housing is comprised of a first end and a second end;

a first bearing positioned at the first end, wherein the first bearing is connected to the handle via a first handle fastener;

a second bearing positioned at the second end, wherein the second bearing is connected to the handle via a second handle fastener; and a band that is connected to the first bearing via a first bearing fastener and is connected to the second bearing via a second bearing fastener.

2. The wheelchair mobility handle device of claim 1, wherein the handle housing is comprised of a channel.

3. The wheelchair mobility handle device of claim 2, wherein the first bearing and the second bearing move within the channel.

4. The wheelchair mobility handle device of claim 1, wherein the handle housing is comprised of an opening.

5. The wheelchair mobility handle device of claim 4, wherein the handle is positioned within the opening.

6. The wheelchair mobility handle device of claim 1, wherein the band is comprised of a non-elastic material.

7. The wheelchair mobility handle device of claim 1, wherein the hollow rim is comprised of an opening.

8. The wheelchair mobility handle device of claim 1, wherein the handle is comprised of a grip area.

9. The wheelchair mobility handle device of claim 1, wherein the handle is attached to the handle housing via a hinge point that allows the handle to articulate 180 degrees relative to a ground surface.

10. The wheelchair mobility handle device of claim 1, wherein each of the first bearing fastener and the second bearing fastener is comprised of a flexible wire or a flexible clip.

11. The wheelchair mobility handle device of claim 1, wherein each of the first handle fastener and the second bearing fastener is comprised of a flexible wire or a flexible clip.

12. The wheelchair mobility handle device of claim 1, wherein each of the first bearing and the second bearing is comprised of a roller.

13. The wheelchair mobility handle device of claim 1, wherein the first bearing and the second bearing are captured within the handle housing.

* * * * *